June 7, 1966   C. P. DE WITT ETAL   3,255,425
VARIABLE RESISTANCE DEVICE
Filed July 26, 1961   3 Sheets-Sheet 1

INVENTORS:
Carlton P. DeWitt
Donald S. DeWitt
By Hofgren, Brady, Wegner, Allen & Stellman
Attys

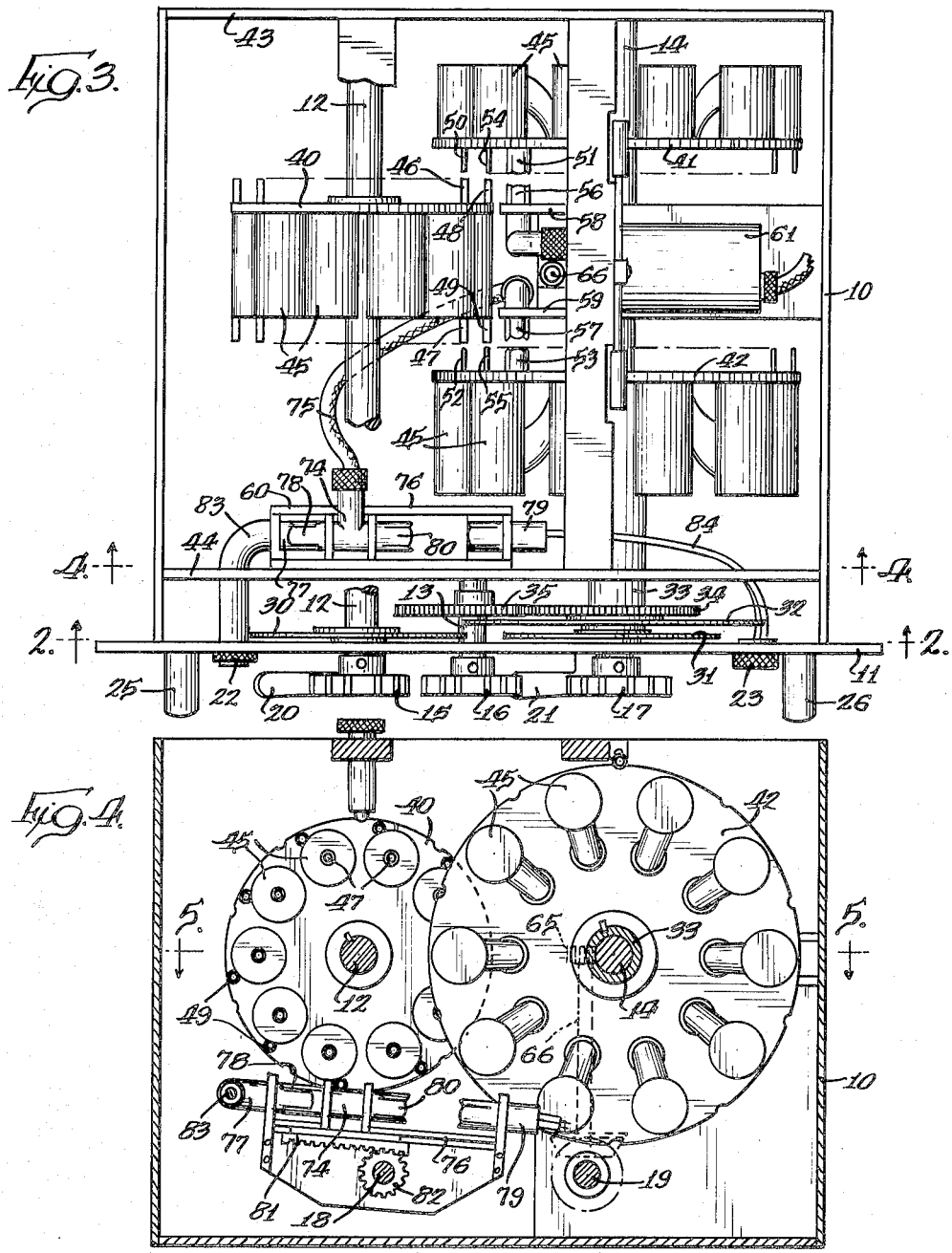

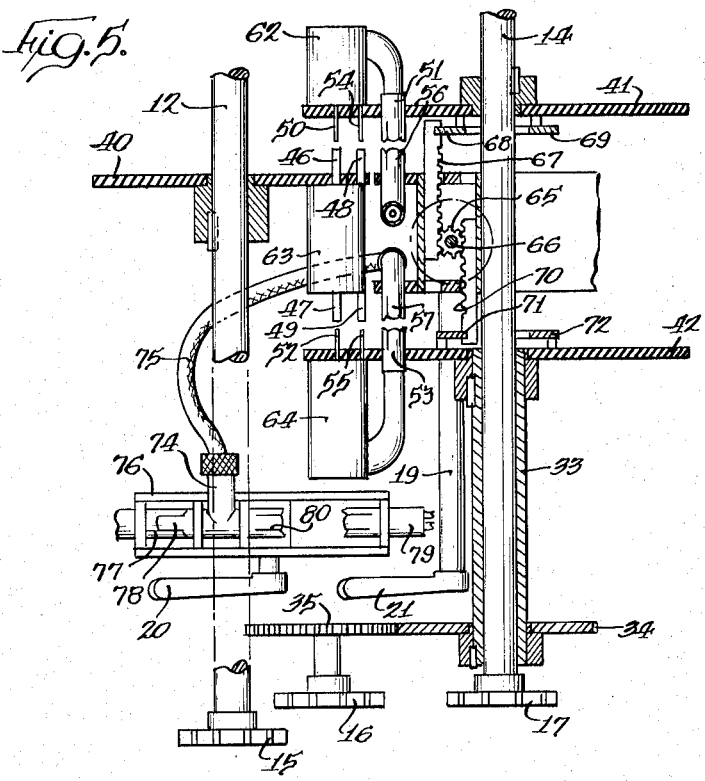
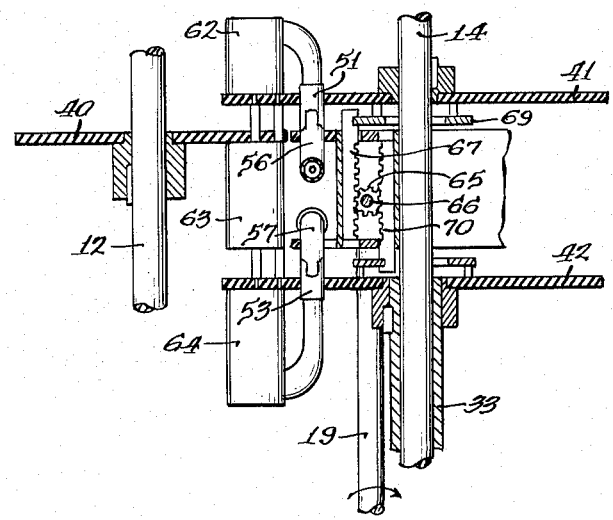

United States Patent Office 3,255,425
Patented June 7, 1966

3,255,425
VARIABLE RESISTANCE DEVICE
Carlton P. De Witt and Donald S. De Witt, both of Oconto, Wis., assignors to Holt Hardwood Company, a corporation of Wisconsin
Filed July 26, 1961, Ser. No. 126,966
10 Claims. (Cl. 333—81)

The present invention relates to a variable resistance device and more particularly to a variable resistance device coupled to a coaxial transfer switch for use in thermal transfer voltage standards.

In the past, it has been customary to connect various resistances in series with an electrical precision measuring instrument so that the range of the measuring instrument such as a galvanometer could be changed. Variable resistances for such purposes usually took form of the multiplicity of resistors from which a group could be selected and then either mechanically or manually connected together. In precision A.C. voltage measurements, it has been found not only necessary to connect such resistances by a shielded method such as coaxial cable but also to keep the total length of the connecting wiring to a minimum. In the case of thermal transfer voltmeters where an A.C. voltage is to be measured by equating it to a D.C. voltage and then measuring the D.C. voltage, it is necessary to also shield an A.C. to D.C. transfer device. In using coaxial cables to connect resistors in a thermal transfer voltmeter, it is desirable to keep the total length of the coaxial line from the input terminals through all the units of the variable resistors to a transfer thermal converter as short as possible, and at the same time decrease capacitive coupling to the shield around and between the high impedance of the resistors. A copending application of Carlton P. De Witt and Daniel J. Stemper, Serial No. 126,965, filed on July 26, 1961, describes a thermal transfer voltmeter of greater accuracy than had been obtained by previous thermal transfer voltmeters. The present invention provides a variable resistance and associated coaxial transfer switch which will maintain the accuracy of such a precision voltmeter.

Therefore, it is the object of the present invention to provide a new and improved variable resistance for use in precision measuring instruments.

Another object is to provide a coaxial line coupling the components of a variable resistance and a coaxial transfer switch together in an over-all line length which is considerably shorter than a wavelength of the A.C. signal to be measured.

A primary object is to provide a short connection between resistors in a shielded variable resistance means which allow a minimum amount of capacitive coupling to the shielding.

A further object is to provide a variable resistance and a coaxial transfer switch for thermal transfer voltmeters wherein the circuit accuracy of the voltmeter is not deteriorated either by the variable resistance or the coaxial transfer switch.

An additional object is to provide a variable resistance for precision instruments composed of a multiplicity of resistors arranged in three decades by mounting them coaxially on three discs.

Yet another object of the present invention is to provide a variable resistance and a coaxial transfer switch coaxially connected together mounted for use in a thermal transfer voltage standard with controls which are capable of quickly transferring the connection to a voltage standard circuit between A.C. and D.C. terminals and can quickly change the selection of resistors in the variable resistance device.

Further objects and advantages will become apparent from the following detailed description taken in connection with the accompanying drawings, in which:

FIGURE 3 is a top plan view of the apparatus illustrated in FIGURE 1;

FIGURE 4 is a vertical section taken along lines 4—4 of FIGURE 3;

FIGURE 5 is a fragmentary transverse section taken along line 5—5 of FIGURE 4; and FIGURE 6 is a view similar to FIGURE 5 with the moving elements differently positioned.

Figure 1:
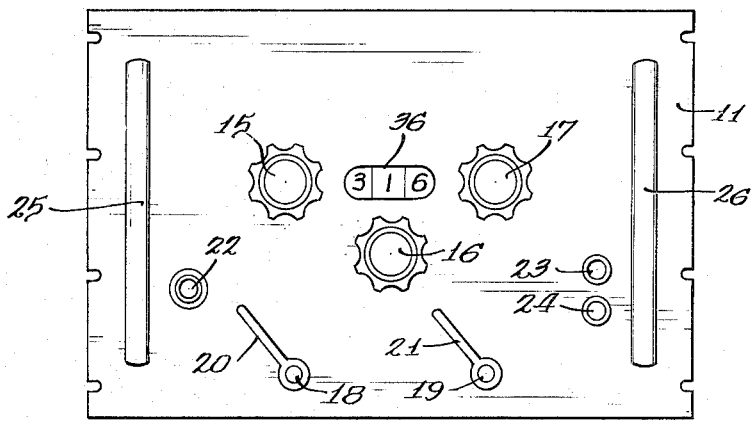
FIGURE 1 is a front elevational view of an apparatus embodying the present invention.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The embodiment of the invention illustrated in the drawings comprises three decades of resistors mounted in individual shield tubes on rotary members in the form of discs. These resistors are located on the circumferences of three discs. Each disc is controlled by a front panel knob. Rotation of the discs aligns the desired resistors for a 143 ohm per volt multiplier string in one volt increments from 1 to 999 volts. Thus a thermal transfer voltmeter in which the variable resistance is employed will have 999 separate cardinal points over its operating range. After the knobs are rotated to select a resistor from each of the three discs which corresponds to one of these 999 cardinal points, a manual control is operated to force these discs into connecting relation with each other and thereby complete a series resistance circuit wth a measuring instrument and a coaxial transfer switch.

In the operation of a thermal transfer voltmeter A.C. is first placed across the variable resistance and measuring instrument and then D.C. is connected with them to provide a comparison. Accordingly, only the frequency response and short term stability resistors enter into transfer accuracy. The accuracy of the individual resistors is not relatively important, but their short term stability and the capacitive coupling to shielding is of prime importance in maintaining the accuracy of a precision instrument such as a thermal transfer voltmeter used as a thermal transfer voltage standard. In the embodiment of the invention illustrated in the figures, the entire length of a coaxial line from a set of input terminals through selected resistors to the measuring instrument is only thirty-four inches long. At an A.C. frequency of 50 kilocycles, this length of line represents less than .015% of one wave length. Thus over a wide range of frequencies, this short length keeps errors due to standing waves at a negligible value.

Figure 2:
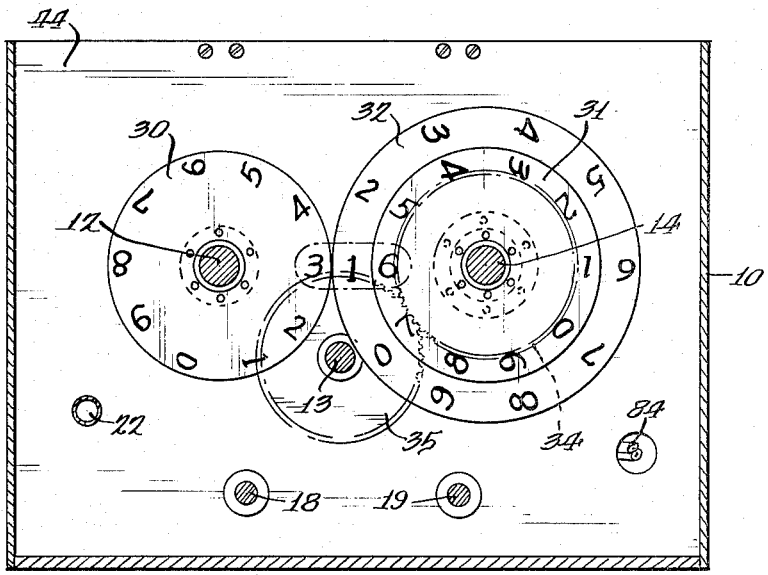
FIGURE 2 is an elevational view of the apparatus illustrated in FIGURE 1 with the front panel removed.

Referring to FIGURES 1 and 2, a housing 10 has a front panel 11 through which three rotary shafts 12, 13 and 14 protrude to receive the control knobs 15, 16 and 17 respectively, and through which a shaft 18 and a shaft 19 protrude to receive the control handles 20 and 21. For the purpose of receiving A.C. current, a coaxial terminal connector 22 is mounted on the panel 11. A pair of D.C.

terminals 23 and 24 are also mounted on the front panel 11 for receiving D.C. current. For the purpose of placing the housing 10 in an electronic equipment rack, a pair of handles 25 and 26 are secured to the front panel 11.

A dial 30 is secured to the shaft 12, and a dial 31 is secured to the shaft 14. Referring now to FIGURE 3 in addition to FIGURES 1 and 2, a dial 32 is rigid on a shaft 33 which is of a hollow cylindrical construction with the shaft 14 rotatably mounted inside. A gear 34 is rigid on the shaft 33 and a meshing gear 35 is rigid on the shaft 13 to produce rotary motion of the shaft 33 by manually rotating the shaft 13. Each of the three dials have the numerals 0 to 9 imprinted thereon so that when they are viewed through an aperture 36 in the panel 11 a number appears which corresponds to one of the 999 cardinal points over the operating range of the thermal transfer voltmeter. Resistors selectively controlled by the knob 15 and dial 30 represent voltage steps of 100 volts. Voltage steps controlled by the knob 16 and dial 32 represent voltage steps of 10 volts, and the knob 17 and dial 31 control a selection of resistors which represents voltage steps of one volt each.

Now referring primarily to FIGURES 3 and 4, three rotary members or discs 40, 41 and 42 are mounted on the shafts 12, 14 and 33 respectively. Discs 41 and 42 are axially slidable on their respective shafts. The shaft 12 is rotatably mounted in a rear portion 43 and a cross member 44 of the housing 10. The shaft 14 is rotatably mounted in the rear portion 43 and the cross member 44. The shaft 33 is rotatably mounted in the cross member 44.

Each of the discs has a series of ten cylindric tube shields mounted thereon as generally indicated at 45 and containing a resistor which is connected to an appropriate connector means. Each resistor contained within a tubular shield on the disc 40 is connected between a pair of female pin connectors such as 46 and 47. Adjacent to each tube shield 45 on the disc 40 is a pair of grounding female pin connectors such as 48 and 49. Each resistor mounted in a tube shield on the disc 41 is connected between a male pin connector such as 50 and a center male connector of a coaxial connector such as 51. Each resistor in a tube shield on the disc 42 is connected between a male pin connector such as 52 and a center male connector of a coaxial connector 53. A grounding male pin connector such as 54 is associated with each resistor on the disc 41 and a male connector such as 55 is associated with each resistor on the disc 42 to align with the grounding connectors such as 48 and 49 on the disc 40. A pair of female coaxial connectors such as 56 and 57 are rigidly mounted to a member 58 and a member 59 respectively of the housing 10 to receive male coaxial connectors such as 51 and 53 from the discs 41 and 42. Each one of the resistors on the three discs corresponds to a number on the three dials. Just by selecting a resistor from the 100, 10 and unit discs by manually dialing the desired voltage as viewed through the aperture 36 on the panel 11 the connectors on the three discs associated with the three desired resistors are brought into alignment with each other and with the coaxial connectors 56 and 57 rigidly secured to the housing 10.

The means for connecting these resistors between an A.C. to D.C. transfer device generally indicated at 60 and a measuring instrument contained in a cylindrical module 61 will be described while referring to FIGURES 5 and 6 in addition to FIGURES 3 and 4. Assume that the resistors, which will properly add up when connected in series to provide the 316 volt cardinal point shown through the aperture 36, are the resistors in the shields 62 on the disc 41, shield 63 on the disc 40 and the shield 64 on the disc 42. FIGURE 5 shows these shields with their respective connectors disengaged while the FIGURE 6 shows these shields with the connectors engaged. Once these three resistors have been rotated into alignment, the handle 21 is rotated clockwise to operate a gear 65 through the shaft 19 and a shaft 66 geared to the shaft 19. The gear 65 meshes with a gear rack 67 having a slot 68 therein slidably receiving a disc 69 rigid to the disc 41 and also meshes with a rack 70 having a slot 71 slidably receiving a disc 72 which is rigidly mounted to the disc 42. As the handle 21 is manually rotated clockwise, gear 65 turns counterclockwise as viewed in FIGURES 5 and 6 to move the discs 69 and 72 towards each other by movement of the racks 67 and 70 respectively. This action draws the discs 41 and 42 towards the disc 40 and causes the connectors to engage each other completing a series resistance circuit from the coaxial connector 56 to the coaxial connector 57. Rotation of the handle 21 in a counterclockwise direction will cause the discs 41 and 42 to back away from the disc 40 allowing the connectors to once again be disengaged.

The structure of the A.C. to D.C. transfer means which is a coaxial transfer switch will now be described. A coaxial T-shaped connector 74 is connected by a coaxial line 75 to the coaxial connector 57 and is slidably mounted on a track 76. A male coaxial connector 77 is rigidly mounted at one end of the track 76 to receive a female connector 78 of the T-shaped connector 74 and a male coaxial connector 79 is mounted at the other end of the track 76 to receive a female connector 80 of the T-shaped connector 74. A gear rack 81 secured to the T-shaped connector 74 meshes with a gear 82 mounted on the shaft 18 to provide a mechanical linkage for moving the T-shaped connector 74 from one end of its range on the track 76 to the other end. The connector 77 is connected by a coaxial line 83 to the A.C. connector 22 on the front panel 11 and the connector 79 is connected to the D.C. terminals 23 and 24 on the front panel 11 by wires 84. The coaxial cable 75 may be connected to either the A.C. coaxial connector 22 or the D.C. terminals 23 and 24 by rotation of the handle 20 counterclockwise or clockwise respectively. With a coaxial transfer switch which employs only coaxial components and disconnects the shielding from the non-selected terminals, maximum protection against stray pick-up is afforded.

All of the sliding connectors associated with both the discs and the transfer switch are constructed of precious metal in order that the over-all resistance from the terminals to the measuring instrument 61 be extremely low except for the resistors themselves and thereby making the selection of any three resistors produce an extremely resistance value. Whenever an A.C. source is connected, the voltage drop across the three chosen resistors is the preponderance of the voltage applied to the terminals and the capacitive coupling between connecting sections and shielding becomes critical. To minimize the amount of coupling, the present invention utilizes short pin connectors such as 46 and 50 with shield pin connectors such as 48 and 54. The resistors in the shields are connected directly to their respective pin connectors with minimum length lead wires. Since the connectors are short it is not necessary to place a shield around them and only connecting pins are required to connect the shields on the discs. Thus the need for coaxial cable between resistors has been eliminated by the present invention with the accompanying benefit of minimized capacitive coupling.

The normal operating procedure for utilizing the apparatus will now be described. An A.C. source whose R.M.S. (root mean square) voltage is to be measured is connected to the coaxial connector 22 and a variable D.C. source is connected to the terminals 23 and 24. A resistance approximately equal to the A.C. voltage is selected by manipulation of knobs 15, 16 and 17. Then handle 21 is rotated clockwise to connect the selected resistors in the tube shields 62, 63 and 64 in a series resistance circuit between the A.C. source and the measuring instrument 61. The handle 20 is rotated counterclockwise to connect the A.C. source to the resistors through the coaxial line 75. A measurement is made of the current flowing through the resistors, as explained in the aforementioned copending application, utilizing measuring instrument 61. The coaxial transfer switch is operated to disconnect the resistors and measuring instrument from the A.C. source and to connect them with the D.C. source. The D.C. source is then varied until the same reading is achieved. A precision voltmeter is utilized to measure the voltage of the D.C. source which is equivalent to the R.M.S. value of the A.C. source. With the use of the variable resistance means and the transfer device just described, the accuracy of such a thermal transfer voltmeter used as a thermal transfer voltage standard might be maintained at .01% or higher.

We claim:

1. The combination of a series of resistors secured to a first rotatory disc rigidly mounted on a first shaft; a series of resistors secured to a second rotatory disc keyed for rotation with a second shaft and axially slidable thereon; a series of resistors secured to a third rotatory disc keyed to a third shaft and axially slidable thereon; connecting means on said three discs for connecting a resistor from each disc in a series resistance circuit; means for selecting resistors on each disc; and a linkage connected to said second and third discs to slide said discs on said second and third shafts whereby selected resistors are connected in a circuit.

2. The combination of a series of resistors secured to a first rotary disc rigidly mounted on a first shaft; a series of resistors secured to a second rotatory disc keyed for rotation with a second shaft and axially slidable thereon; connecting means on said two discs for connecting a resistor from each disc in a series resistance circuit; means for selecting resistors on each disc; and a linkage connected to said second disc to slide said second disc on said second shaft whereby selected resistors are connected in a circuit.

3. A precision adjustable resistance, comprising: a plurality of planar supporting members; a plurality of resistors on each of said supporting members, each of said resistors having connectors; means mounting said members for movement generally in the respective planes thereof to align the connectors of selected resistors; and means responsive to movement of one of said members in a direction transverse to the plane thereof for completing a circuit through said connectors and selected resistors.

4. A precision adjustable resistance, comprising: a plurality of planar supporting members; a plurality of resistors on each of said members, each of said resistors having connectors which extend outwardly generally at right angles to the plane of the associated supporting members; means mounting said supporting members for movement relative to each other, in the respective planes thereof to align the connectors of selected resistors; and means for moving at least one of said members generally at right angles to the plane thereof to engage the connectors with the aligned connectors and complete a circuit for said resistors.

5. The resistance of claim 4 wherein said resistors are enclosed in shields and each resistor and each shield has a connector which extend outwardly at right angles to the plane of said supporting member.

6. A coaxial transfer switch comprised of a support track, a coaxial T-shaped connector having three connectors consisting of a center conductor and a shielding conductor surrounding said center conductor, said T-shaped connector slidably supported on said track, said center conductors being connected together and said shielding conductors being connected together, a gear rack secured to said coaxial T-shaped connector, a manually operated control shaft, a gear rigid on said shaft and meshing with said gear rack, a coaxial connector rigid at one end of said track to receive one of said three connectors when said coaxial T-shaped connector slides to said one end of the track, and a coaxial connector rigid at the other end of said track to receive another of said three connectors when said coaxial T-shaped connector slides to said other end of said track.

7. The combination of a series of resistors secured to a first rotary disc rigidly mounted on a first shaft; a series of resistors secured to a second rotary disc keyed for rotation with a second shaft and axially slidable thereon; a series of resistors secured to a third rotary disc keyed to a third shaft and axially slidable thereon, a coaxial transfer switch; connecting means on said three discs for connecting a resistor from each disc in a series resistance circuit; conecting means connecting said transfer switch to said circuit; means for selecting resistors on each disc; a linkage connected to said second and third discs to slide said discs on said second and third shafts respectively whereby selected resistors and said transfer switch are connected in a series circuit.

8. The combination of a series of resistors secured to a first rotary disc rigidly mounted on a first shaft; a series of resistors secured to a second rotary disc keyed for rotation with a second shaft and axially slidable thereon; a series of resistors secured to a third rotary disc keyed to a third shaft and axially slidable thereon, said second shaft being of hollow cylindrical construction with said third shaft rotatable in said second shaft; and means for selecting resistors on each disc consisting of a dial rigid on said first shaft having resistor identifying numerals thereon, a means for manually rotating said first shaft, a fourth shaft geared to said second shaft, a dial rigid on said fourth shaft having resistor identifying numerals thereon, a means for manually rotating said fourth shaft, a dial rigid on said third shaft having resistor identifying numerals thereon, and a means for manually rotating said third shaft.

9. The combination of a series of resistors mounted in individual shield tubes and secured to a first rotatory disc rigidly mounted on a first shaft; a series of resistors mounted in individual shields and secured to a second rotatory disc keyed for rotation with a second shaft and axially slidable thereon; a series of resistors mounted in individual shields and secured to a third rotatory disc keyed to a third shaft and axially slidable thereon; a coaxial transfer switch; mating connecting pins on said three discs and mating coaxial connectors on said second and third discs for connecting a resistor from each disc in a series resistance circuit; a pair of mating coaxial connectors for receiving said coaxial connectors on said second and third discs; a coaxial line connecting said coaxial transfer switch and one of said pair of coaxial connectors; a means for selecting resistors on each disc; a manually operated linkage connected to said second and third discs to slide said discs on said second and third shafts respectively whereby selected resistors, said coaxial lines connected to said pair of coaxial connectors and said coaxial transfer switch are connected in a series circuit.

10. The combination of a series of resistors mounted in individual shield tubes and secured to a first rotatory disc rigidly mounted on a first shaft; a series of resistors mounted in individual shields and secured to a second rotatory disc keyed for rotation with a second shaft and axially slidable thereon; a series of resistors mounted in individual shields and secured to a third rotatory disc keyed to a third shaft and axially slidable thereon; said second shaft being of hollow cylindrical construction with said third shaft rotatable in said second shaft; a coaxial transfer switch comprising an electrical coaxial T-shaped connector slidably mounted along its principal axis over a range, a mating coaxial connector receiving the T-shaped connector at one end of its slidable range and connected to A.C. terminals by a coaxial cable, a mating coaxial connector receiving the T-shaped connector at the other end of its slidable range and connected to D.-C. terminals; and a mechanical linkage for manually sliding said T-shaped connector over its range;

mating connecting pins on said three discs and mating coaxial connectors on said second and third discs for connecting a resistor from each disc in a series resistance circuit; a pair of mating coaxial connectors for receiving said coaxial connectors on said second and third discs; a coaxial line connecting said T-shaped connector and one of said pair of coaxial connecors; a coaxial line connected to the other coaxial connector of said pair of coaxial connectors; means for selecting resistors on each disc consisting of a dial rigid on said first shaft having resistor identifying numerals thereon, a means for manually rotating said first shaft, a fourth shaft geared to said second shaft, a dial rigid on said fourth shaft having resistor identifying numerals thereon, a means for manually rotating said fourth shaft, a dial rigid on said third shaft having resistor identifying numerals thereon, and a means for manually rotating said third shaft; a manually operated linkage connected to said second and third discs to slide said discs on said second and third shafts respectively whereby selected resistors, said coaxial lines connected to said pair of coaxial connectors and said coaxial T-shaped connector are connected in a series circuit.

References Cited by the Examiner

UNITED STATES PATENTS

| | | | |
|---|---|---|---|
| 1,957,538 | 5/1934 | Jensen | 338—76 |
| 2,223,585 | 12/1940 | Tarpley | 323—79 |
| 2,261,961 | 11/1941 | Christensen | 323—79 |
| 2,423,463 | 7/1947 | Moore | 323—79 |
| 2,429,401 | 10/1947 | Davis | 333—81 |
| 2,451,201 | 10/1948 | Clark | 333—81 |
| 2,510,613 | 6/1950 | Webber | 333—81 |
| 2,643,294 | 6/1953 | Shaw | 333—81 |
| 2,680,225 | 6/1954 | Stevens | 323—74 |
| 2,848,693 | 8/1958 | Harges | 333—81 |
| 2,894,197 | 7/1959 | Berry | 323—79 |
| 3,014,187 | 12/1961 | Sher | 333—81 |
| 3,070,763 | 12/1962 | Reslock | 333—81 |
| 3,107,334 | 12/1962 | Harges | 333—81 |

FOREIGN PATENTS 637,442   5/1950   Great Britain.

HERMAN KARL SAALBACH, *Primary Examiner.*

C. BARAFF, *Assistant Examiner.*